(12) United States Patent
Baumann

(10) Patent No.: US 7,469,964 B2
(45) Date of Patent: Dec. 30, 2008

(54) SEATING SYSTEM FOR PASSENGER SERVICE VEHICLES, FOR AIRCRAFT IN PARTICULAR

(75) Inventor: Jürgen Baumann, Ludwigshafen (DE)

(73) Assignee: Recaro Aircraft Seating GmbH & Co. KG, Schwaibsch Hall (DE)

( * ) Notice: Subject to any disclaimer, the term of this patent is extended or adjusted under 35 U.S.C. 154(b) by 471 days.

(21) Appl. No.: 11/228,465

(22) Filed: Sep. 19, 2005

(65) Prior Publication Data

US 2007/0194174 A1    Aug. 23, 2007

(30) Foreign Application Priority Data

Sep. 7, 2005    (DE)    ........................ 10 2005 042 376

(51) Int. Cl.
*A47C 15/00*    (2006.01)

(52) U.S. Cl. .................. 297/232; 297/249; 297/411.33; 297/452.4; 244/118.6

(58) Field of Classification Search ................. 297/232, 297/248, 249, 411.37, 411.33, 452.4; 244/118.6, 244/122 R
See application file for complete search history.

(56) References Cited

U.S. PATENT DOCUMENTS

| | | | | |
|---|---|---|---|---|
| 1,399,744 | A | * | 12/1921 | Brophy .................. 297/411.33 |
| 3,926,473 | A | * | 12/1975 | Hogan .......................... 297/115 |
| 4,085,967 | A | * | 4/1978 | Spencer ........................ 297/115 |
| 4,165,901 | A | * | 8/1979 | Swenson et al. ....... 297/411.33 |
| 4,768,832 | A | * | 9/1988 | Wain ...................... 297/411.37 |
| 4,917,438 | A | * | 4/1990 | Morgan .................. 297/411.37 |
| 5,178,345 | A | * | 1/1993 | Peltola et al. ............. 244/118.6 |
| 5,180,120 | A | * | 1/1993 | Simpson et al. .......... 244/118.6 |
| 5,509,722 | A | * | 4/1996 | Beroth ...................... 297/452.4 |
| 5,553,813 | A | * | 9/1996 | Merensky ................ 244/118.6 |
| 5,775,642 | A | * | 7/1998 | Beroth ...................... 244/118.6 |
| 5,909,864 | A | * | 6/1999 | Wang ..................... 248/289.11 |
| 6,076,768 | A | * | 6/2000 | Durand et al. ........... 244/118.6 |
| 6,793,282 | B2 | * | 9/2004 | Plant et al. .................. 297/248 |

* cited by examiner

*Primary Examiner*—Laurie K Cranmer
(74) *Attorney, Agent, or Firm*—Posz Law Group, PLC

(57) ABSTRACT

1. Seating system for passenger service vehicles, for aircraft in particular

Figure 1:
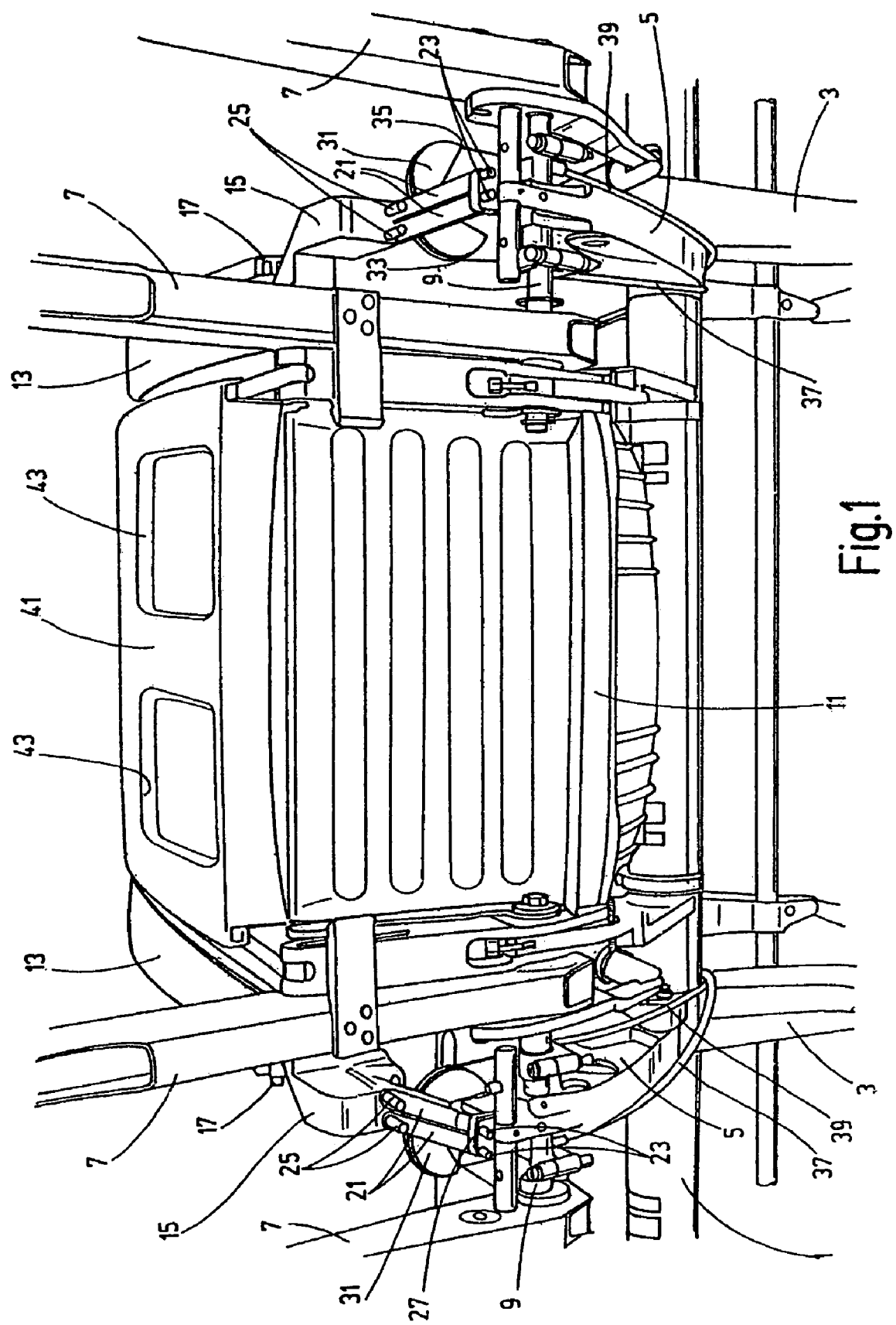

2. In a seating system for passenger service vehicles, for aircraft in particular, having a plurality of seats mounted side by side for the purpose of forming a row of seats which are limited laterally by the arm rests (13) determining the seat width, at least one of which arm rests is operated in conjunction with an adjoining arm rest (13) on a seat positioned beside it for the purpose of adjustment in the transverse direction of the seat to positions which correspond to different seat widths, by means of an adjustment mechanism having lever gearing with two articulated levers (21) having a parallelogram guide, each levers (21) being mounted on one side on pivot axes (23) positioned on the bearing structure (5) of the seat row and on the other side on pivot axes (25) connected to the arm rest (13), the pivot axes (23, 25) being positioned in parallel with each other and separated by the same distances from each other for the purpose of forming the parallelogram, the pivot axes (23, 25) of the parallelogram guide extending in the longitudinal direction of the seat and at least in approximation horizontally in relation the standard installed position of the seat row.

9 Claims, 4 Drawing Sheets

SEATING SYSTEM FOR PASSENGER SERVICE VEHICLES, FOR AIRCRAFT IN PARTICULAR

The invention relates to a seating system for passenger service vehicles, aircraft in particular, having a plurality of seats mounted side by side for the purpose of forming a row of seats which are limited laterally by the arm rests determining the seat width, at least one of which arm rests is operated in conjunction with an adjoining arm rest on a seat positioned beside it for the purpose of adjustment in the transverse direction to the seat to positions which correspond to different seat widths, by means of an adjustment mechanism having lever gearing with two articulated levers forming a parallelogram guide, each lever being mounted on one side on pivot axes positioned on the bearing structure of the seat row and on the other side on pivot axes connected to the arm rest, the pivot axes being positioned in parallel with each other and separated by the same distances from each other for the purpose of forming the parallelogram.

As is known, different comfort classes in correspondingly different fare categories are offered to passengers in passenger service vehicles such as aircraft or ferries. Seats differing in configuration are made available to the passengers, the width in particular of the seating area made available varying among the categories such as first class, business class, and economy class.

Configuration of seating systems for such applications so that the possibility exists of conversion for the purpose of adaptation to different comfort classes in seat rows with several seats positioned side by side is also of the prior art. EP 0 335 018 B1, for example, discloses a seating system of the kind described in the foregoing, one which may be converted so that a seating system with three seats positioned side by side (for economy class, for example) or a seat row with two seats is available, the width of the seating area being enlarged in the latter case and it being possible to move a table element into a use position in which it spans the intervening space remaining between the seats despite the enlargement of the width of the seating area.

In the known solution the parallelogram guide is configured so that the arm rests are mounted so as to be movable in a horizontal plane (in relation to the standard installed position of the seating system) for the purpose of changing the seat width. Hence it is necessary to provide for every adjustable-position arm rest a mechanism whereby the arm rest is secured against the forces occurring in operation which act in the direction transverse to the seat. A correspondingly high expenditure on structural design is required in order to ensure high safety of operation.

In view of this prior art the object of the invention is to make available a seating system which is distinguished by a simple and rugged design while high reliability of operation is guaranteed.

In the case of a seating system of the type indicated in the foregoing it is claimed for the invention that this object is attained in that the pivot axes of the parallelogram guide extend in the longitudinal direction of the seat and at least in approximation horizontally in relation to the standard installed position of the seat row.

With the parallelogram guide as thus designed the configuration devised may be such that the articulated levers are in a position tilted to one side or to the other side in relation to the vertical both in the adjusted position corresponding to the standard seat width and in the position corresponding to the enlarged seat width, the arm rest being at the use height desired in both adjusted positions. Consequently, transfer of the arm rest from one adjusted position to the other adjusted position does not result from horizontal displacement but in that the arm rest follows an arc-shaped path of movement which rises until it reaches the central intermediate position in which the articulated levers of the parallelogram guide are vertical and then falls again until the other adjusted position is reached. That is to say, the arm rests are positively locked in the respective adjusted position by the force of their weight and the loads acting on the arm rests during operation, so that separate locking may be dispensed with.

The parallelogram guide may be configured to particular advantage in that the parallelogram guide forms a self-locking mechanism when the respective adjusted position is reached. Provision may be made for this purpose such that the pivot axes of the parallelogram guide are positioned in a common horizontal plane at both ends of the articulated levers and are separated from each other by a distance such that the articulated levers define the respective adjusted end positions of the arm rest when the first and second adjoining adjusted positions of of the arm rest are reached.

A coupling mechanism which effects common change of position of the adjustable-position arm rests and which operates in conjunction with the adjustment mechanism of the two arm rests is present in especially advantageous exemplary embodiments. One such exemplary embodiment is characterized by particular user friendliness, since only one arm rest need be moved in order to convert a seat row with three seats to a seat row with two wider seats and vice versa.

A coupling mechanism such as one in the form of Bowden cables may be provided, cables which permit transmission of tensile force between coupling elements which are connected to the adjustment mechanism of the arm rests involved from the viewpoint of effect. The configuration arrived at may be such that the adjustment mechanism of each arm rest has a coupling element like a cable drum which may be rotated by the pivoting movements of the parallelogram guide in question and forms a point of engagement for a Bowden cable on both sides of the axis of rotation of this rotary movement. The Bowden cable is guided between the points of engagement of the coupling system in such a way that one end of the Bowden cable engages a point of engagement of the coupling element opposite the outer seat of the seat row while the other end engages the point of engagement of the coupling element opposite the center seat. Consequently, the pivoting movement of one parallelogram guide results in a pivoting movement in the opposite direction of the other parallelogram guide, so that the arm rests move together toward each other or away from each other when position adjustments are made.

In order to make use of the intervening space which remains between two seats after the seating width of the seats has been increased in that arm rests adjoining the intervening space have been moved to adjusted positions in which the seats are closer to each other, a table element may be provided which moves from a storage position in the support area of the backrest of the center seat to a use position at a distance from the support area, in which position it forms an approximately horizontal table surface, the adjustable-position arm rests extending when in their second position along the sides edges of the table element in the use position.

Figure 2:
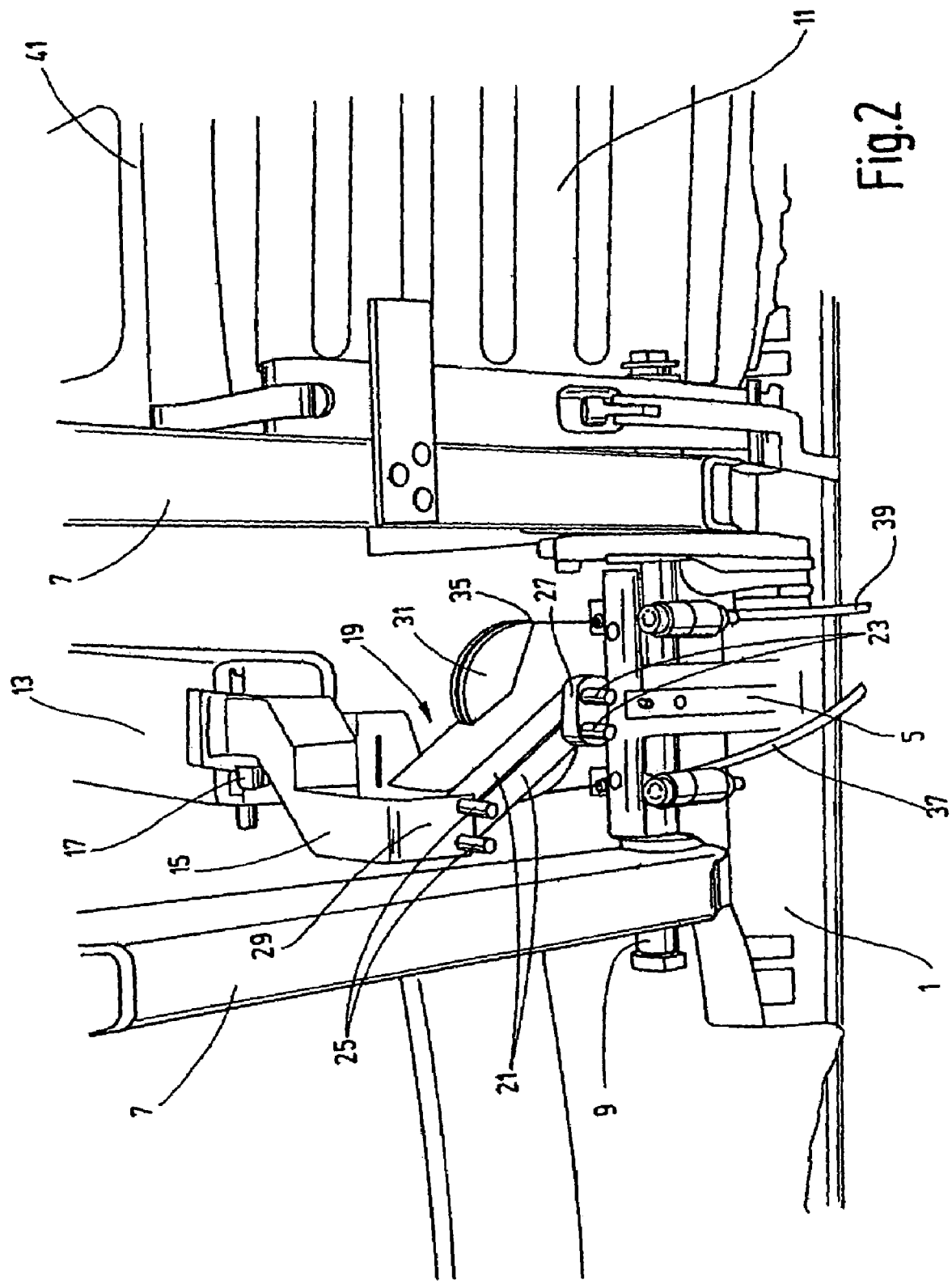
Figure 3:
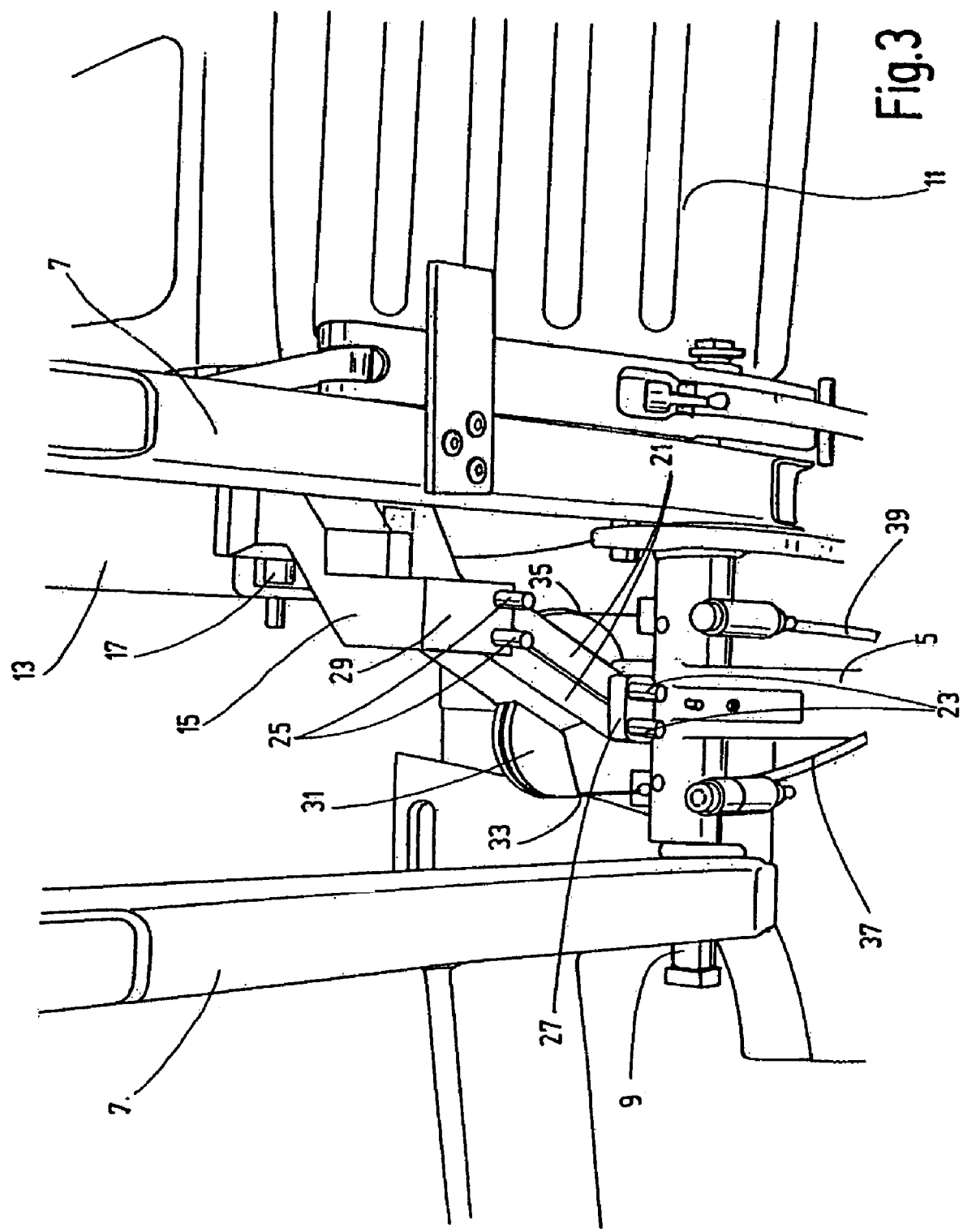

The invention is described in detail in what follows with reference to the exemplary embodiment illustrated in the drawings, in which FIG. 1 presents a perspective rear view of a greatly simplified diagram exclusively of the central area of a row of seats of an exemplary embodiment of the seating system claimed for the invention, only part of the structural elements essential to understanding of the invention being shown, with covering removed;

FIG. 2 a partial diagram on a scale larger than that of FIG. 1 exclusively of the essential structural elements in the area of an adjustable-position arm rest which is in its first of two usable second adjusted position;

FIG. 3 a diagram corresponding to that of FIG. 2, but with the arm rest in its second adjusted position; and FIG. 4 a simplified diagram on an even larger scale of a rear view of an adjustable-position arm rest with associated adjustment mechanism corresponding to that of the exemplary embodiment described below of the seating system claimed for the invention.

FIG. 1 shows the central area of a row of seats with three seats positioned side by side, a support crossbeam 1 extending in the transverse direction forming a primary component of the bearing structure, which is mounted on upright legs 3 so as to be upright on a cabin floor not shown. Backrest beams 7 are pivotably mounted on inclined axes 9 for adjustment of backrest tilt, on the structural elements 5 connected to the support crossbeam 1. A seat shell of the central seat mounted on the bearing structure is designated as 11.

Of the arm rests belonging to the row of seats only the adjustable-position arm rests 13 adjacent to the center seat are visible. These arm rests 13 are shown in FIG. 1 in an adjusted position in which they are separated from each other by the shortest distance in the transverse direction of the seats. This adjusted position, which in this text is designated as "second position," corresponds to the operational state of the seat row in which the seat width of the two seats positioned on the outside is increased, a seat row originally with three seats being converted to a seat row with two seats between which there is no central seat but an otherwise usable intervening space.

FIG. 3 shows a section of the arm rest 13 shown in FIG. 1 in precisely this second position, while FIG. 2 shows the same arm rest 13 in the first position, in which it forms no enlargement of the widths of the outer seats, so that, when the arm rest 13 is in this first position, a central seat of the same width as that of the outer seats is available between the outer seats.

Each adjustable-position arm rest 13 is mounted on an arm rest carrier 15 which has the shape of an arm bent at a right angle in the end area of which the arm rest proper is mounted on a folding joint 17 so that it may be folded upward from an approximately horizontal use position to the backrest (not shown).

The arm rest carrier 15 forms in its end area opposite away from the folding joint 17 part of a parallelogram guide designated as a whole as 19 having two [ ] of the same configuration pivotably mounted on their lever ends on parallelogram pivot axis 23 on the structure side and parallelogram pivot axis 25 on the arm rest side. The pivot axes 23 on the structure side extend horizontally in a common plane and in the longitudinal direction of the seat (direction of travel, direction of flight). The pivot axes 25 on the arm rest side also extend in a common horizontal plane in parallel with the structure-side pivot axes 23, the arm-rest-side pivot axes 25 being spaced from each other at the same distances as the structure-side pivot axes 23. The structure-side pivot axes 23 are positioned on a bearing element 27 of the fixed structural element 5, while the arm-rest-side pivot axes 25 are on an end piece 29 of the arm rest carrier 15, while a recess opening downward in the end piece 29 receives the upper end areas of the articulated levers 21 mounted so as to be movable.

Figure 4:
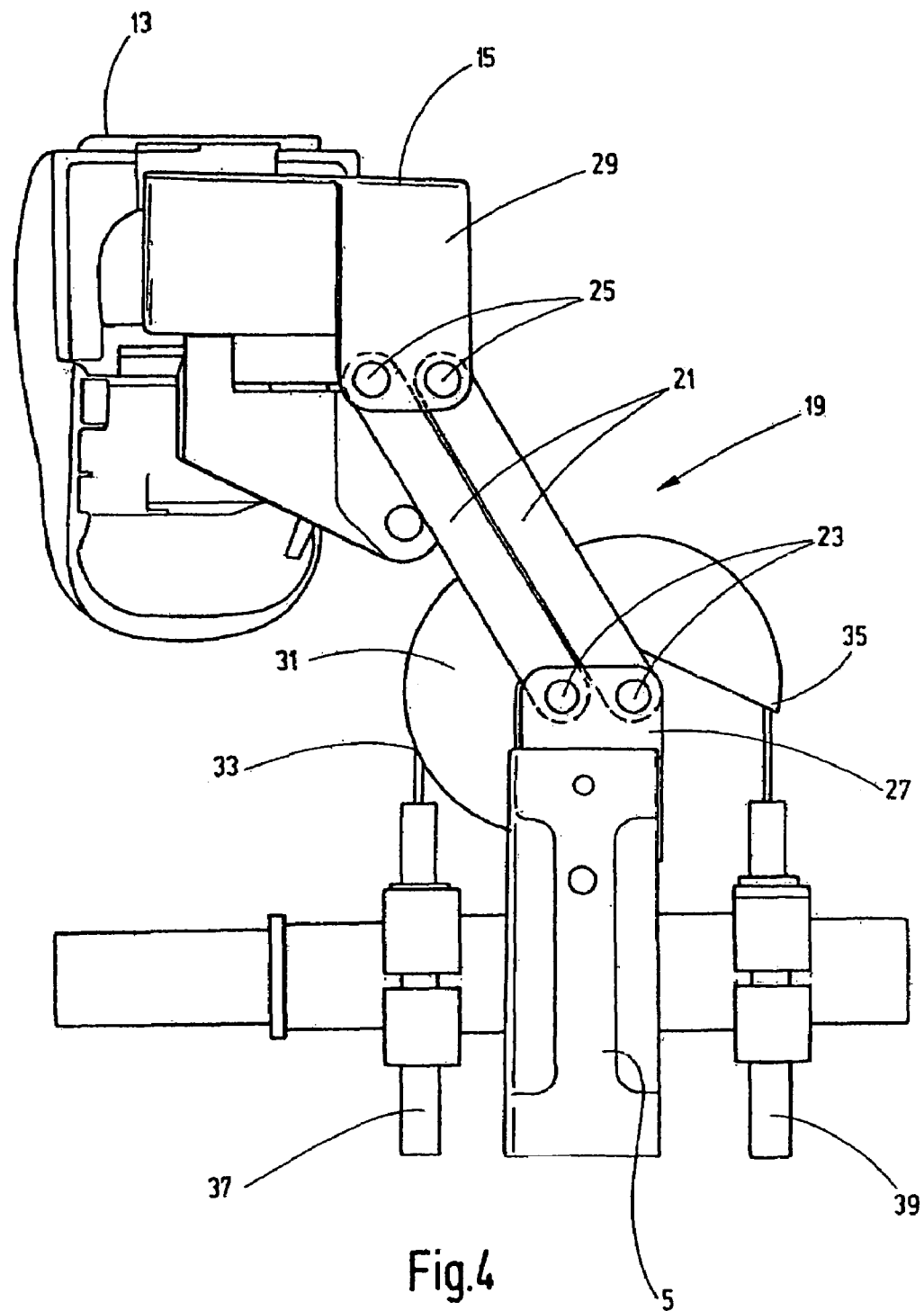

FIGS. 2 and 4 illustrate the parallelogram guide 19 in the state corresponding to the first position, in which the articulated levers 21 are tilted from the vertical position counterclockwise to the left as seen in the line of sight to FIGS. 2 and 4. As is clearly to be seen, in FIG. 4 in particular, the articulated levers 21 are positioned side by side in the dimensioning shown in FIG. 4 (width of the articulated levers 21) and the axial spacing selected for the pivot axes 23 and 25 in the position illustrated in FIGS. 2 and 4, so that the parallelogram guide 19 is irreversibly prevented from further counterclockwise pivoting movement.

If the arm rest 13 shown in FIGS. 2 and 4 is transferred from the first position to the second position, the parallelogram guide 19 now being pivoted clockwise, there is a change in the vertical position of the arm rest 13, which reaches its highest point when the articulated levers 21 are vertical and moves down again until the second position illustrated in FIG. 3 is reached. In this second position the articulated levers 21 in turn are positioned side by side so that the parallelogram guide 19 is irreversibly prevented from executing additional clockwise pivoting movement.

Since the movement of the respective arm rest between the operating positions indicated takes place in the course of change in elevation, the arm rest 13 is secured in the first and the second positions by the force of the weight of the arm rest 13, including that of the operating loads applied to it.

A coupling mechanism between the adjustment mechanisms of the adjustable-position arm rest 13 causes movement of adjustment of one arm rest 13 to result in corresponding movement of adjustment of the other arm rest 13. In the present example a coupling element 31 of the nature of a cable drum is connected to each parallelogram guide 19 so that the coupling element 31 is also rotated by the pivoting movements of the parallelogram guide 19. Each coupling element 31 has, on each side of the center of rotation of the pivoting movements of the parallelogram guide, and thus of the center of rotation of the coupling element 31, a point of engagement 33 and 35; as viewed in the line of sight to the figure the point of engagement 33 is positioned on the left a specific distance from the center of rotation and the point of engagement 35 on the right side of the center of rotation. A cable line provided as coupling mechanism has a first Bowden cable 37 and a second Bowden cable 39. These Bowden cables are guided between the coupling elements 31 of the two parallelogram guides 19 in such a way that the Bowden cable engaging the point of engagement 33 offset to the left, this being Bowden cable 37 in the example illustrated in FIGS. 2 and 4, by its second end also engages the point of engagement 33, also displaced to the left side, of the other coupling element 31 and in such a way that the Bowden cable 39 engaging the point of engagement 35 of the of the coupling element 33 also engages the point of engagement 35 displaced to the right. Consequently, a movement adjusting an arm rest 13 results in a synchronous movement adjusting the other arm rest 13, the coupling element 31 of the other arm rest being simultaneously rotated to the same angle of rotation, but in the opposite direction of rotation.

In order to make use of the intervening space between the two arm rests 13 when in the second position, a table element 41 can be provided which may be pivoted from a storage position (not shown) in which it is folded so as to rest against the backrest of the center seat and, for example, forms a part of the upholstered area of the backrest, into a use position illustrated in FIG. 1. As FIG. 1 shows, the table element 41 extends between the arm rests 13 in the second position, so that a table surface is formed between them in which trough-like recesses 43 may be provided for formation of circumscribed positioning surfaces.

If desired, a second coupling mechanism may be provided which generates a positioning movement for the movable table element 41 on the basis of the movement of adjustment in the second position in transfer of the arm rest 13 in order to transfer this element automatically from the storage position to the use position or in order to initiate a positioning movement which returns the table element 41 to the storage position when the arm rests 13 are transferred from the second position to the first position.

The invention claimed is:

1. A seating system for passenger service vehicles, for aircraft in particular, comprising:
   a plurality of seats mounted side by side forming a row of seats, wherein each seat is limited laterally by arm rests, which determine a seat width;
   an adjustment mechanism for operating at least one of the arm rests in conjunction with; an adjacent arm rest for adjustment in the transverse direction of the seats between a first position and a second position, wherein the first position and the second position correspond to different seat widths;
   a bearing structure for supporting the row of seats on a vehicle floor;
   a first group of pivot axes, which are positioned on the bearing structure;
   a second group of pivot axes connected to the arm rest;
   the adjustment mechanism having lever gearing with two articulated levers forming a parallelogram guide, each lever being mounted, at one end, on the first group of pivot axes, and an opposite end, on the second group of pivot axes, wherein
   the pivot axes of the first and second group are parallel with each other and separated by equal distances from each other to form the parallelogram guide,
   the pivot axes of the parallelogram guide extend in a longitudinal direction of the scat and approximately horizontally in relation to the vehicle floor,
   the pivot axes of the parallelogram guide at both ends of the articulated levers are positioned in a common horizontal plane and are spaced at a distance from each other such tat the articulated levers define the respective end positions of adjustment of the arm rests, and the parallelogram guide forms a self-locking mechanism when the first and the second positions of the arm rests adjacent to each other are reached.

2. The seating system as claimed in claim 1, wherein the row of seats is formed by three seats positioned side by side with a center seat and two outside seats, wherein two arm rests adjoin the center seat, and wherein the position of the two arm rests may be adjusted between the first position, in which the three seats are positioned side by side with the same seat width, and the second position, in which the arm rests may be moved nearer to each other in order to increase the width of the two outside seats.

3. The seating system as claimed in claim 2, farther comprising a coupling mechanism that operates in cooperation with the adjustment mechanism of the two arm rests and effects a simultaneous change of position of said two arm rests.

4. The seating system as claimed in claim 3, wherein the adjustment mechanism of the two adjustable-position arm rests has a coupling element in the form of a cable drum, which is rotatable by the pivoting movements of the parallelogram guide, and
   a Bowden cable configuration is present as part of the coupling mechanism and converts movement of rotation of one coupling element to movement of rotation of the other coupling element trough the same angle of rotation but in the opposite direction of rotation.

5. The seating system as claimed in claim 4, wherein
   the coupling element has, on each parallelogram guide, a point of engagement positioned on both sides of the axis of rotation of the coupling element forte cable configuration
   the cable configuration is in the form of two Bowden cables that are guided between the coupling elements so tat one end of the Bowden cable engages a point of engagement opposite the outer seat of the row of seats and the other end engages a point of engagement of the other coupling element opposite the center seat.

6. The seating system as claimed in claim 2, wherein
   a table element is provided which may be moved from a storage position in the lean area of a back rest of the center seat to a use position removed from the lean area in which it forms an approximately horizontal table surface, and
   the adjustable-position arm rests extend when in their second position along the side edges of the table element when in the use position 7. The seating system as claimed in claim 1, wherein the end of the parallelogram guide opposite the arm rest is hinge-connected by means of the parallelogram pivot axes to an arm rest carrier, on which the arm rest is mounted, so tat the arm rest may be folded upward about a horizontal axis extending in the transverse direction of the seat.

8. The seating system as claimed in claim 1. wherein during an adjustment between the first and the second position the arm rests follow an arc-shaped path of movement which from the first position rises until it reaches an intermediate position, in which the articulated levers of the parallelogram guide are vertical, and then falls again until the second position is reached.

9. A seating system for passenger service vehicles, for aircraft in particular, comprising:
   a plurality of seats mounted side by side forming a row of seats, whereim each seat is limited laterally by arm rests, which determine a seat width; and
   an adjustment mechanism for operating at least one of the arm rests in conjunction with an adjacent arm rest of an adjacent seat for adjustment in the transverse direction of the seats between a first position and a second position, wherein the first position and the second position correspond to different seat widths, wherein
   the adjustment mechanism includes gearing with two articulated levers forming a parallelogram guide, each lever being mounted, at one end on pivot axes positioned on a bearing structure of the seat row and, at an opposite end, on pivot axes connected to the arm rest, the pivot axes of the parallelogram guide extend in a longitudinal direction of the seat and approximately horizontally in relation to the vehicle floor,
   the pivot axes of the parallelogram guide extend in the longitudinal direction of the seat and approximately horizontally in relation to the standard installed position of the row of seats wherein
   the row of seats is formed by three seats positioned side by side with a center seat and two outside seats, and the at least one of the arm rests is one of two arm rests that are located on opposite sides of the center seat,
   the adjustment mechanism is one of two adjustment mechanisms that regulate the two armrests, respectively,
   the position of the two arm rests may be adjusted between the first position, in which each of the three seats has the same seat width, and the second position. in which the arm rests are moved nearer to each other to increase the seat width of the two outside seats, the seating system includes a coupling mechanism, which cooperates with the two adjustment mechanisms and causes the arm rests to move together simultaneously, the coupling mechanism includes a cable drum, which is rotated by pivoting movements of the parallelogram guide, and the coupling mechanism includes a Bowden cable that converts rotational movement of one of the adjustment mechanisms to rotational movement of the other adjustment mechanism through equal angles of rotation but in opposite directions.

* * * * *